Patented Sept. 21, 1926.

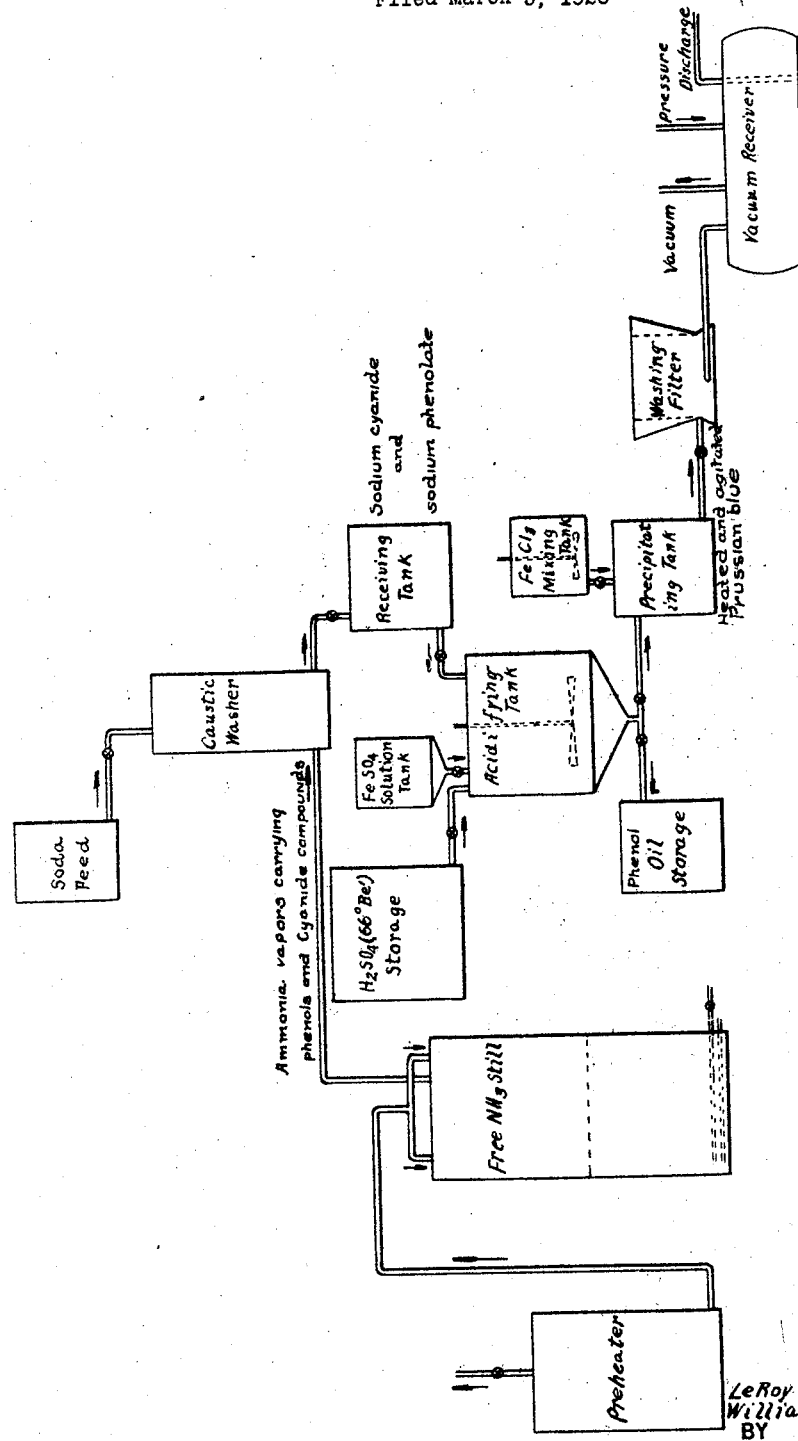

1,600,228

UNITED STATES PATENT OFFICE.

LE ROY WILBUR HEFFNER, OF EAST NORRISTOWN TOWNSHIP, MONTGOMERY COUNTY, AND WILLIAM TIDDY, OF JEFFERSONVILLE, PENNSYLVANIA, ASSIGNORS TO RAINEY-WOOD PROCESS CORPORATION, OF NEW YORK, N. Y., A CORPORATION OF DELAWARE.

RECOVERY OF CYANIDE.

Application filed March 3, 1926. Serial No. 91,889.

This invention relates to improvements in the recovery of cyanide from ammoniacal gas liquor.

In the distillation of ammoniacal liquor for the manufacture of concentrated ammonia or ammonium sulfate, the liquor often contains considerable amounts of cyanide. The present invention relates to an improved process of recovering this cyanide.

According to the present invention the ammoniacal vapors from the ammonia still are subjected to a scrubbing treatment, e. g. with a caustic soda solution with the result that the ammonium cyanide or the cyanide compounds are absorbed as sodium cyanide. The cyanide so absorbed is i. e., treated with ferrous and ferric iron salts in a slightly acid solution with resulting formation and precipitation of Prussian blue, which is obtained as the product of the process and which contains the cyanides in a commercially valuable form.

In its broader aspects the invention includes the recovery of cyanide from the distillation of ammonia carried out to produce ammoniums sulfate. For example, the amount of ammoniacal liquor to be distilled is limited and when the ammonia is recovered as ammonium sulfate by the indirect process the ammoniacal vapors from the ammonia still can advantageously be subjected to treatment with caustic soda to absorb the cyanide as sodium cyanide, leaving the ammonia in a purified condition to pass along to the saturator. This will result in the production of ammonium sulfate free from blue coloration.

A particularly advantageous embodiment of the invention is one in which the recovery of the cyanide is combined with the separation or recovery of phenolic compounds from the ammoniacal gas liquor. In our prior Patents Nos. 1,566,795 and 1,566,796 granted December 22, 1925, we have described the process of separating and recovering phenolic compounds from ammoniacal gas liquors in which the distillation of liquor is carried out with the maintenance of a sufficently high temperature at the top of the ammonia still i. e., around 98 degrees C. or higher to insure driving off of phenolic compounds as ammonium phenolate in the ammoniacal gases.

The improved process of the present invention can advantageously be combined with and carried out as the process of the said prior patent, the process being in this respect an improvement upon the process of said patent.

When the distillation is carried out to separate and recover phenols in accordance with the process of our prior patents the same caustic soda absorbent used for absorbing phenol can be used for absorbing the cyanide and the ammonia passing along to the saturator or to other place of absorption or use may be freed both from phenolic compounds and from cyanide.

In the carrying out of this combined process the ammonia stills are operated at a sufficiently high temperature to maintain the liquor at the top of the still and the escaping ammoniacal vapors at a temperature around 98 degrees C., or higher so that phenolic compounds will be carried off with the ammonia. The gas liquor can advantageously be preheated before introducing it into the ammonia still and this preheating can be carried out in one or another of the ways mentioned in our said prior patents.

The ammoniacal gases escaping from the top of the ammonia still, either without or with preliminary cooling by dephlegmation are then passed to the caustic soda absorber. Where refluxing is used between the still and absorber the temperature should not be reduced below about 98 degrees C. so as to avoid condensation of ammonium phenolate. Where, for example, the temperature at the outlet of the vapors from the still is around 104 degrees C., the temperature of the vapors can be reduced e. g. to around 98-99 degrees C. before the vapors pass along to the phenol and cyanide absorber. The vapors that enter the absorber give up their cyanide and phenol to the caustic soda forming sodium phenolates and sodium cyanide. The purified ammoniacal gases then pass along for further treatment. The caustic soda absorbent can sufficiently be maintained at a high temperature so that further absorption of water vapor does not take place and so that the said caustic soda solution is not distilled. The purified ammoniacal gases can then be subjected to further condensation or dephlegmation to remove further amounts of water therefrom and the ammoniacal condensate can be returned to the still as described in our prior patents. The purified ammonia gas can then be passed to the saturator or absorber or to other place of storage or use.

When phenolic compounds as well as cyanide are contained in the ammoniacal gases and absorbed in the caustic soda absorber the resulting solution will contain both sodium phenolate and sodium cyanide. The use of this absorbing solution can be carried out in various kinds of absorbers including absorbers operating under the countercurrent scrubbing principle. The solutions will progressively increase in phenolic and cyanide content until they become practically saturated and of little value for further absorbent. When absorption has taken place to the desired extent a ferrous salt, e. g. ferrous sulfate, is added and then the solution is acidified sufficiently to separate the phenols which would separate for the most part as a separate layer and can be drawn off as one of the products of the process. The remaining slightly acid solution is then treated with ferric iron salts to produce Prussian blue.

After the solution has been acidified and the phenolic oils separated and removed, the mixture of acidified solutions and iron cyanogen may be transferred to a precipitating tank and agitated and heated with live steam to a temperature of about 80 degrees C. and the ferric salt added to form Prussian blue. After the precipitation has taken place the mixture may be filtered through a filter press to collect the Prussian blue as one of the products of the process.

Cyanides can be profitably recovered in this way from gas liquor when the cyanide content of the liquor is sufficient, provided sufficient gas liquor is treated and the cyanides can be recovered in the form of Prussian blue as a valuable product of the process.

The invention will be further described in connection with the accompanying drawing showing in a conventional and diagrammatic manner and in the nature of a flow sheet or flow diagram an arrangement of apparatus adapted for carrying out the new process. It will be understood that the invention is illustrated by this further specific description, but is not limited thereto.

In the accompanying drawing an ammonia still is shown conventionally made up of a free ammonia still, lime leg and fixed ammonia still with a preheater for preheating the liquor for the still so that it may enter the still at a temperature around 98 degrees C. or higher. From the top of the free ammonia still the ammoniacal gases containing phenolic compounds and cyanide pass to the absorber indicated on the drawing as a caustic washer. This may be of suitable construction such as a counter-current absorber with the gases flowing upwardly and the caustic soda solution flowing downwardly or the gases may bubble up through the body of the caustic soda solution. The caustic soda in the tank of e. g., 1000 gallons capacity is shown conventionally for supplying the caustic soda solution to the caustic washer. The phenolic compounds are decomposed with formation of sodium phenolate and the ammonium cyanide and other cyanide are absorbed as sodium cyanide. The ammoniacal gases pass from the absorber to a saturator or place of other treatment or use.

From the caustic washer the solution containing the cyanide and phenolate passes to a receiving tank of e. g., 3000 gallons capacity and is then drawn off as absorbent into the acidifying tank of e. g., 2000 gallons capacity and which is provided with a suitable agitator.

Ferrous sulfate is supplied in suitable amount from the solution tank of e. g., 400 gallons capacity. Sulfuric acid e. g., concentrated acid of 66 degrees Baumé may be supplied from the acid storage tank e. g., of about 88 gallons capacity in amount required to slightly acidify the solution in the acidifying tank. The acid solution is permitted to rest to permit separation of phenolic compounds as a separate layer of phenolic oil. The solution is then drawn off into the precipitating tank of e. g., 3000 gallons capacity while the separated oils are drawn off into a suitable oil storage tank of e. g., 5000 gallons capacity.

The precipitating tank is provided with an agitator and with heating means (not shown) for heating e. g., with live steam to a temperature of about 80 degrees C. when iron chloride solution is added from a suitable mixing tank e. g., 250 gallons capacity, the amount of iron chloride added being sufficient to react with the iron cyanogen to form Prussian blue. After the reaction takes place the solution containing the precipitated Prussian blue passes to a suitable filter in which the Prussian blue is separated and in which it is washed. It can then be dried and used as a commercial product. The solution from the filter passes to a vacuum receiver e. g., of 2500 gallons capacity and can then be run to waste or used for other purpose.

It will thus be seen that the present invention provides an improved method of producing Prussian blue from the cyanide content of ammoniacal gas liquor in which the ammoniacal vapors from the still are scrubbed with a suitable absorbent solution such as a caustic soda solution to combine with the cyanide as sodium cyanide thus purifying the ammoniacal gasses or cyanide. The cyanide thus recovered is then treated by acidifying and by adding iron salts to form Prussian blue so that the cyanide content is recovered in the form of Prussian blue.

It will further be seen that the invention provides an improved process of separating or recovering phenolic compounds from ammoniacal gas liquor in which such separation or recovery is combined with recovery of cyanide; and that both the phenolic compounds and cyanide can be simultaneously absorbed from the ammoniacal vapors, and the vapors purified therefrom, giving a resulting solution which is then subsequently treated to recover therefrom the phenolic compounds in the form of a phenolic oil and the cyanide compounds in the form of Prussian blue.

While we have described the use of a caustic soda solution for absorbing the cyanide or cyanide phenolic compounds, yet other suitable absorbent solution can be used in a similar way.

We claim:

1. The method of recovering cyanides which comprises treating gases containing ammonia and cyanides with an absorbing medium to absorb the cyanides preferentially from the gas and converting the absorbed cyanides into Prussian blue.

2. The method of recovering cyanides from ammoniacal gas liquor which comprises subjecting such liquor to distillation for the driving off of ammoniacal vapors containing cyanides therefrom, treating such ammoniacal vapors with an alkali solution to combine with the cyanides as alkali cyanides, acidifying the resulting solution of cyanide in the presence of a ferrous salt and precipitating the cyanide as Prussian blue.

3. The method of treating ammoniacal gas liquor which comprises subjecting the liquor to distillation with maintenance of the temperature of the escaping vapors in the still of about 98° C. or higher to drive off phenolic compounds and cyanide compounds with the ammonia, treating the ammoniacal vapors with an absorbent for the phenols and cyanide compounds and thereby separating such compounds from the ammoniacal vapors, treating the absorbed compounds to separate phenolic oils and converting the cyanides into Prussian blue.

4. The method of treating ammoniacal gas liquor which comprises subjecting the liquor to distillation with maintenance of the temperature of the escaping vapors in the still at about 98° C. or higher to drive off phenolic compounds and cyanide compounds with the ammonia, treating the ammoniacal vapors with a caustic soda solution to form sodium phenolate and sodium cyanide from the phenolic and cyanide compounds, adding a ferrous salt, acidifying the solution to set free phenolic oils and precipitating the cyanides in the form of Prussian blue.

5. The method of recovering phenols and cyanide compounds from ammoniacal vapors containing them which comprises treating such vapors with a caustic soda solution or its equivalent, to combine with the phenols and cyanide compounds to form sodium phenolate and cyanide, acidifying the resulting solution in the presence of a ferrous salt to separate phenolic compounds and oils, adding a ferric salt to the remaining solution and heating and agitating the same to precipitate Prussian blue.

6. The method of treating gas liquor which comprises subjecting the same to distillation in an ammonia still with maintenance of the temperature of the vapors at the outlet from the still at about 98° C. or higher and with sufficient ammonia present in or added to the still to insure substantially complete removal of phenolic compounds with the ammonia, treating the resulting ammoniacal vapors with caustic alkali solution to separate phenolic and cyanide compounds from the ammonia vapors, acidifying the resulting solution to set free phenolic compounds and precipitating the cyanides from the acidified solution as Prussian blue.

7. The method of treating gas liquor which comprises subjecting the same to distillation in an ammonia still with maintenance of the temperature of the vapors at the outlet from the still at about 98° C. or higher and with sufficient ammonia present in or added to the still to insure substantially complete removal of phenolic compounds with the ammonia, treating the resulting ammoniacal vapors with caustic alkali solution to separate phenolic and cyanide compounds from the ammonia vapors, adding a ferrous salt, acidifying the resulting solution to set free phenolic compounds, precipitating the cyanides from the acidified solution as Prussian blue, and returning part of the purified ammonia gas from which phenolic and cyanide impurties have been removed to the still to increase the ammonia content thereof.

8. The method of treating ammoniacal liquors and recovering cyanides therefrom which comprises distilling ammonia from such liquors, treating the ammoniacal vapors with an alkaline solution, adding a ferrous salt, acidifying the solution, adding a ferric salt and precipitating the cyanides with heat and agitation in the form of Prussian blue.

9. The method of treating ammoniacal liquors and recovering cyanides therefrom which comprises distilling ammonia from such liquors while maintaining the temperature of the vapors escaping from the still at about 98° C. or higher, treating the ammoniacal vapors with an alkaline solution, adding a ferrous salt, acidifying the solution whereby to set free phenolic oils, separating such oils, and treating the solution of cyanides with ferrous and ferric salts and precipitating the cyanides as Prussian blue with heat and agitation while maintaining a temperature of about 80° C.

In testimony whereof we affix our signatures.

LE ROY WILBUR HEFFNER.
WILLIAM TIDDY.